(12) United States Patent
Detampel, Jr. et al.

(10) Patent No.: US 6,330,321 B2
(45) Date of Patent: *Dec. 11, 2001

(54) METHOD FOR ON-DEMAND TELECONFERENCING

(75) Inventors: Donald Francis Detampel, Jr., Westminster; Ronald D. Phillips, Golden; Thomas Edward Yackey, Jr., Broomfield, all of CO (US); Gregory Wayne Selig, Greenbay, WI (US); Eric Jay Nylander, Morrison; Kevin Dale Barnes, Thornton, both of CO (US)

(73) Assignee: Voyant Technologies, Inc., Westminster, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/772,590

(22) Filed: Jan. 29, 2001

Related U.S. Application Data

(63) Continuation of application No. 09/366,355, filed on Aug. 3, 1999, now Pat. No. 6,181,786, which is a continuation of application No. 08/825,477, filed on Mar. 28, 1997, now Pat. No. 5,995,608.

(51) Int. Cl.[7] ............................. H04M 3/56; H04M 7/00; H04L 12/18
(52) U.S. Cl. ............... 379/205.01; 370/261; 379/204.01; 379/221.08
(58) Field of Search .................................. 348/7, 13, 14, 348/15, 14.01, 14.08, 14.09, 14.1; 370/260, 261, 262; 379/202.01, 203.01, 204.01, 205.01, 206.01, 207.01, 221.08, 221.09

(56) References Cited

U.S. PATENT DOCUMENTS

| | | | |
|---|---|---|---|
| 4,475,189 | 10/1984 | Herr et al. | 370/261 |
| 4,529,842 | 7/1985 | Levy et al. | 379/202.01 |
| 4,540,850 | 9/1985 | Herr et al. | 379/88.19 |
| 4,945,534 | 7/1990 | Driscoll et al. | 370/260 |

(List continued on next page.)

FOREIGN PATENT DOCUMENTS

| | | | |
|---|---|---|---|
| 57-050165 | 3/1982 | (JP) | H04M/3/56 |
| 05-103103 | 4/1993 | (JP) | H04M/3/56 |
| 06-225055 | 8/1994 | (JP) | H04M/3/56 |

OTHER PUBLICATIONS

ITU–T—Specification of Signalling System No. 7 (Mar. 1993).

*Primary Examiner*—Harry S. Hong
(74) *Attorney, Agent, or Firm*—Dorr, Carson, Sloan & Birney, P.C.

(57) ABSTRACT

An on-demand teleconferencing system and method for setting up an on-demand conference call in a telecommunications system having the Advanced Information Network (AIN) architecture with system signaling the number 7 (SS7) and a Public Switched Telephone Network (PSTN). A subscriber is assigned an on-demand conference call number. When that number is dialed into the PSTN, it is identified by the PSTN that the dialed number requires handling by the SS7. The SS7 links the dialed number to a conference allocation and control system (CACS) which is connected to a plurality of scalable bridge servers. The CACS selects bridge servers available to handle the conference call and based upon a selection criteria such as a peak load sets up the on-demand conference call in one of the selected bridge servers.

14 Claims, 7 Drawing Sheets

U.S. PATENT DOCUMENTS

| | | | |
|---|---|---|---|
| 4,953,159 | 8/1990 | Hayden et al. | 370/265 |
| 5,210,794 | 5/1993 | Brunsgard | 380/257 |
| 5,369,694 | 11/1994 | Bales et al. | 379/206.01 |
| 5,384,840 | 1/1995 | Blatchford et al. | 379/229 |
| 5,408,518 | 4/1995 | Yunoki | 379/67.1 |
| 5,475,747 | 12/1995 | Bales et al. | 379/202.01 |
| 5,483,588 | 1/1996 | Eaton et al. | 379/202.01 |
| 5,495,522 | 2/1996 | Allen et al. | 379/202.01 |
| 5,526,413 | 6/1996 | Cheston, III et al. | 379/230 |
| 5,535,200 | 7/1996 | Gardner | 370/410 |
| 5,544,237 | 8/1996 | Bales et al. | 379/205.01 |
| 5,559,875 | 9/1996 | Bieselin et al. | 379/202.01 |
| 5,559,876 | 9/1996 | Alperovich | 379/205.01 |
| 5,583,925 | 12/1996 | Bernstein | 379/202.01 |
| 5,590,127 | 12/1996 | Bales et al. | 370/260 |
| 5,812,653 | 9/1998 | Jodoin et al. | 379/205.01 |
| 5,995,608 * | 11/1999 | Detampel, Jr. et al. | 379/204 X |
| 6,181,786 * | 1/2001 | Detampel, Jr. et al. | 379/205 |

* cited by examiner

METHOD FOR ON-DEMAND TELECONFERENCING

FIELD OF THE INVENTION

This application is a Continuation of U.S. Pat. No. 6,181,786, Ser. No. 09/366,355, filed Aug. 3, 1999, entitled "METHOD AND APPARATUS FOR ON-DEMAND TELECONFERENCING" which is a Continuation of U.S. Pat. No. 5,995,608, Ser. No. 08/825,477, filed Mar. 28, 1997, entitled "METHOD AND APPARATUS FOR ON-DEMAND TELECONFERENCING."

BACKGROUND OF THE INVENTION

1. Statement of the Problem

Corporations frequently encounter situations where a meeting between geographically separated parties would be appropriate, but the expenses associated with physical travel are prohibitive to that meeting taking place. In this situation, teleconferencing provides a convenient, low-cost solution by allowing individuals from various geographic locations to have a meeting over the telephone. Teleconferencing is also used within companies where parties to a meeting would not necessarily have to travel, but where meeting size exceeds available meeting space, or where gathering all meeting participants in one place is deemed inefficient. Private parties can also make use of teleconferencing for communicating simultaneously with multiple friends or family members over the phone.

In the past, teleconferencing was practiced from within a Private Branch Exchange (PBX) by manually dialing out to connect each participant to the others, with each participant placed on hold until all were connected to the conference originator. The disadvantages of this technique are many, with the most important being the continuing degradation in audio quality as each attendee is added, which often becomes unacceptable beyond three attendees. Additionally, this teleconferencing method is inconvenient and time-consuming.

Successor technology to PBX teleconferencing utilized conferencing bridge systems which used signal processing techniques to improve audio quality by controlling which talkers were summed together and provided to conference attendees as audio output of the bridge system. The primary disadvantage of this system is that the bridge system encompasses a limited number of voice channel resources, or ports, whose utilization must be manually monitored, scheduled, and controlled by an operator. This limitation requires users to schedule conferences in advance by specifying the time, duration, and number of ports required for the conference. What is needed is an automatic conferencing system or service that connects conferees together in teleconferences without a need for prior reservation or operator interaction.

Prior art conferencing bridge systems require that all system components be physically co-located to allow for operator control and system maintenance. This prevents the system from taking advantage of such flexibility and cost-saving techniques as least-cost routing and geographic load management. What is needed is the ability to locate conferencing hardware, specifically bridge resources, across a wide area geographically and still retain overall system control within a central location. In this system, conferences could occur physically on whatever hardware was determined to be the best choice from load-control and routing cost considerations, and the particular bridge selected for a conference would be unimportant and transparent to both conferees and operators.

Current conferencing systems support a limited selection of control interfaces available to conferees, most supporting Dual-Tone Multifrequency (DTMF) and operator controls only. A need exists for a system or service that allows the flexibility of a variety of control interfaces, including DTMF, operator, World Wide Web (WWW), and E-mail. Furthermore, all of the available interfaces should provide status information that is updated automatically whenever a status change takes place as a result of a command entered via one of the interfaces.

Present conferencing bridge systems are limited to supporting a maximum of a few hundred conferencing ports within a single system, which leads to high customer cost when use load of the system becomes high enough to warrant the addition of additional conferencing ports. This typically requires the purchase of an entire new bridge system. What is needed is a system that can be scaled in small port capacity increments from a few hundred up to many thousands of ports, without the need for an entire system purchase at each scaling point.

Prior art conferencing methods are highly prone to faults due to failed or partially-incapacitated hardware resources. For example, a hardware failure in a bridge will likely result in the need for manual intervention by conferencing operators to ensure that new conferences are not started on that bridge. Conferences in progress on that bridge may also be affected by being prematurely terminated. This can also happen upon a failure of central controlling software. What is needed is a system that can dynamically and automatically route new conferences away from failed hardware resources, as well as allow conferences in progress to continue despite a failure within the control system.

The following patents minimize the use of an operator in setting up a conference call. U.S. Pat. No. 5,559,876 to Alperovich provides a conferencing feature wherein an initiating subscriber creates a list of directory numbers for participants in a memory along with a conferencing code. The initiating subscriber must actually enter in the directory number of each participant for storage in the memory. To establish a conference call, the initiating subscriber enters the conference code. Conferencing circuitry detects the conferencing code and automatically conferences together participants associated with the directory numbers in memory. The '876 patent requires the initiating subscriber to enter the names and numbers of participants in advance of the conference call.

U.S. Pat. No. 5,408,518 issued to Yunoki provides a teleconference sponsor with the ability to reserve a teleconference in advance. The teleconference sponsor inputs data on the date and time of the teleconference run and data on the names of all teleconference participants. The '518 system registers the teleconference and then notifies the teleconference participants, in advance of the teleconference, by means such as a recorded message setting forth the date and time of the teleconference. Hence, the '518 patent requires reservation of a teleconference by the subscriber and then a separate process for notifying the teleconference participants prior to the time for the teleconference. The '518 system then calls up the respective teleconference participants registered in the database.

U.S. Pat. No. 5,483,588 issued to Eaton, et al., like the '518 and '876 patents set forth above, minimizes the need for a human operator to perform teleconferencing tasks. A user dials a "profile access" number, which permits the user to schedule a conference, select a conference to attend, manage recorded voice segments, and perform basic administrative functions such as changing their password. After the user has entered a correct profile and password access, the user can schedule a conference. If the user wishes to schedule a conference call in the future, the user enters the date, time, length and number of attendees. The system determines whether or not sufficient resources are available at that date and time with that length and number of attendees to schedule the call. If not enough resources are available, the user is asked to reschedule the conference call. Otherwise, the system prompts the caller for the conference call name and the agenda for the conference call. The system provides an ID number. If the user-wants an immediate conference, the system performs the same steps to determine availability of resources. Attendees to the conference can then call in and input the ID. If the ID is proper, the attendee is added to the conference call.

U.S. Pat. No. 5,559,875 issued to Bieselin, et al. sets forth a method and apparatus for recording and retrieval of audio conferences. The audio portion of the conference is recorded and digitized and placed in blocks of a determined size. These blocks are then stored on a computer storage medium so that they can be located and played back later.

None of the above patents solve the needs set forth above.

2. Solution to the Problem

The present invention solves the above problems by providing a novel system and method in the way that conferencing bridge resources are managed and dynamically allocated to process conference calls using scalable bridge(s) with real time resources.

SUMMARY OF THE INVENTION

The requirements for prior scheduling and operator interaction imposed by the prior art approaches are eliminated, thus providing conference attendees with a completely automated interface with the bridge system.

This present invention makes use of the Advanced Information Network (AIN) architecture currently in place in the North American telephone network. Specifically, Signaling System 7 (SS7) out-of-band signaling is utilized to dynamically route incoming conference calls to bridges with available resources, which may be in geographically diverse locations within a single conferencing system. This approach allows for least-cost routing and therefore reduced network costs for subscribers, as well as virtually unlimited system scalability. Additionally, dynamic call routing allows for system redundancy and fault-tolerance, since calls can easily and automatically be routed away from a failed bridge resource to a functioning one.

Each subscriber to the conferencing service of the present invention is given a telephone number for connecting to the conferencing system, along with a system passcode and a maximum conference size at the time he or she signs up for the service. In order to have a conference, the subscriber distributes his or her telephone number to the conference participants, along with a PIN code of the subscriber's choosing. The conference is initiated when the subscriber dials in to the system, enters the subscriber passcode, and enters the conference PIN. Attendees then dial into the conference using the subscriber's phone number, enter the subscriber-supplied PIN, and are connected to the conference. Facilities for operator interaction with conference participants are provided, but are designed to be necessary only in a small fraction of conferences, for example when a subscriber forgets a passcode or when operator assistance is specifically requested by a conference subscriber or participant. Conferees are further provided with a variety of interfaces to the system for entering status changes by means of DTMF signals, WWW (internet) commands and/or E-mail, and viewing status information about their conference.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

1. Overview—In the following description, for purposes of explanation, numerous specific details are set forth in order to provide a thorough understanding of the present invention. It is important to understand that the present invention may be practiced with some or all of these specific details. Conventional hardware and systems are shown in block diagram form and process steps are shown in flowcharts. Furthermore, it is readily apparent to one skilled in the art that the specific processes in which system and method details are presented and functions are performed set forth the preferred embodiment and such processes can be varied and still remain within the spirit and scope of the present invention. The system described herein utilizes a dial-in plan where each subscriber has a unique telephone number that is used to access the conferencing system, but it is further contemplated that the system could be implemented with a single dial-in number for use by all conference participants, and still remain within the spirit and scope of the present invention.

Figure 1:
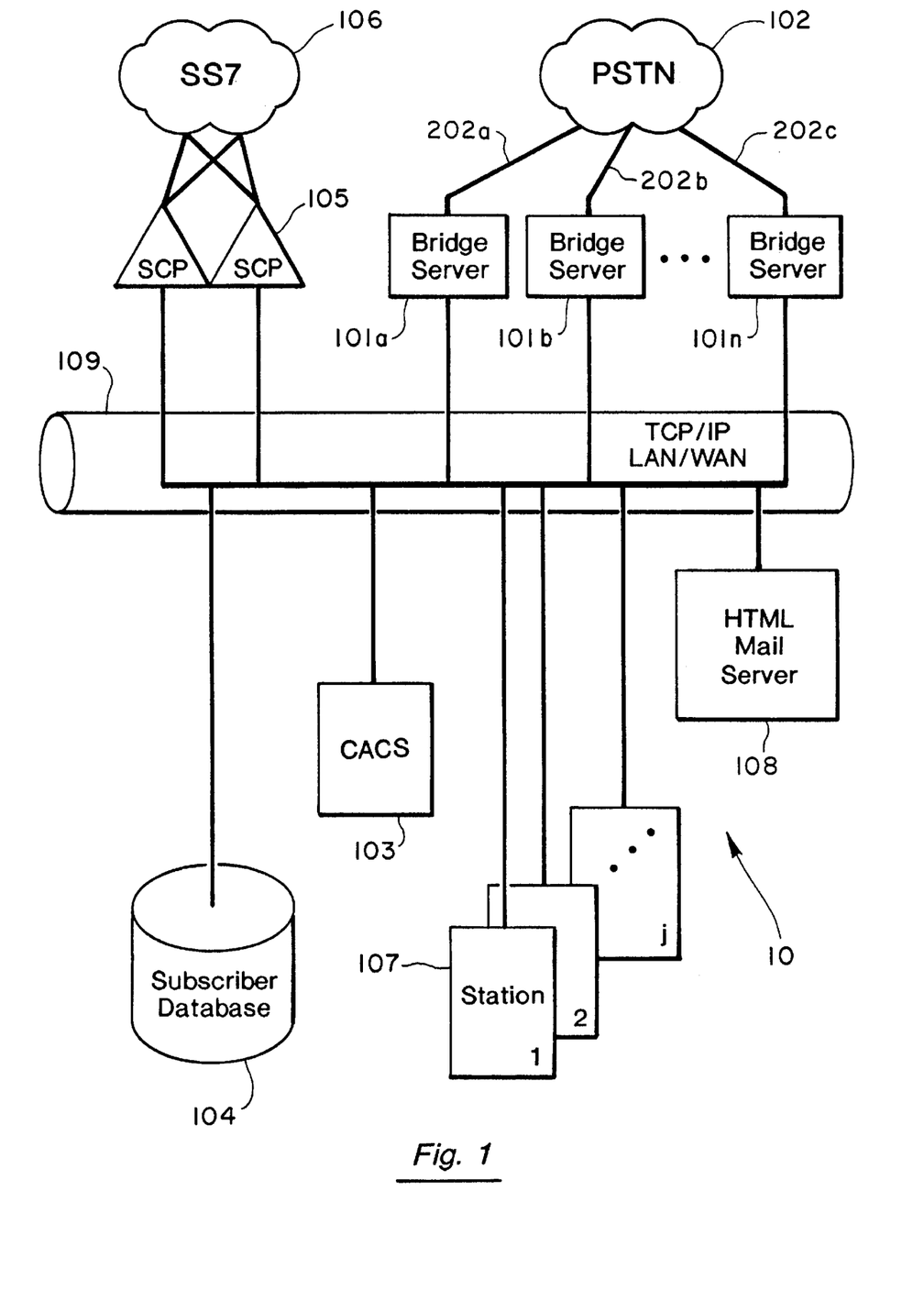
FIG. 1 is a block overview of one embodiment of the present invention, including telecommunication system connections.

2. On-Demand Conferencing System 10—FIG. 1 shows a block diagram of a system embodiment 10 that will accomplish the scope of the present invention. The conferencing system consists of a plurality of bridge servers 101 that physically connect to the conventional Public Switched Telephone Network (PSTN) 102 and provide digital signal processing, conferencing, call flow, and other conference-related functionality.

The bridge servers 101 can be of any suitable number (i.e., 101a, 101b, ... 101n) and can physically be located at any geographic location. For example, the bridge servers can number twenty with each bridge server 101 having as many as 600 ports. Each bridge server 101 is connected to the PSTN 102 via a conventional telecommunications channels 202.

The bridge servers 101 are managed and controlled by the Conference Allocation and Control System (CACS) 103, which is implemented as software residing on a workstation or other processing platform. The CACS 103 is connected to a subscriber database 104 over network 109. The conventional Service Control Point (SCP) hardware pair 105 is physically connected to Signal Transfer Point (STP) pair 404 within the SS7 network 106 (See FIG. 4), and handles SS7 translation number queries, thereby directing incoming calls to a specific bridge server 101 resource with sufficient available ports to service the on-demand conference. One or a plurality of PC operator/maintenance stations 107 may be connected to the CACS 103 over network 109 to provide operator interaction with the system 10. The plurality of stations 107 can be of any number (i.e., 1–j). The system 10 also includes an HTML/mail server 108 to support WWW and E-mail user interfaces over the network 109. All system components are linked together via TCP/IP Local Area Network (LAN) or Wide Area Network (WAN) 109 that allow inter-communication of commands and data among the various system components. TCP/IP is an acronym for Transmission Control Protocol, Internet Protocol and is a collection of conventionally available protocols for use on network 109.

Under the teachings of the present invention, the CACS 103 (unlike conventional designs where the CACS is integral to a single bridge server 101), of the present invention connects to a plurality of bridge servers 101*a*–101*n* over the LAN/WAN 109. This is an important feature of the present invention in that it provides scalability and dynamic allocation. Scalability is achieved wherein a single bridge server 101 can have its existing ports expanded by adding new port cards to the bridge, (for example: expanding from 400 to 600 ports). Scalability also includes the addition of bridge server (s), such as bridge server 101*n* in FIG. 1. The CACS 103 increases the number of bridges and the number of bridge ports available in a bridge status table that is stored in memory of the CACS 103. Unlike conventional bridge servers each having its own CACS, the topological configuration of FIG. 1 allows the bridge servers 101 to increase in the number of ports and to have additional bridge servers added all under a single CACS control 103.

The system 10 of the present invention also provides dynamic allocation of the bridge resources available. By having a single CACS 103 controlling all bridge servers 101*a*–101*n*, the available capacity of each bridge is immediately known by the CACS 103. This is stored in the bridge status table, which will be discussed in greater detail subsequently. However, when an on-demand conference call request comes in, the CACS 103 determines which bridge servers 101 have sufficient availability of ports to handle the on-demand conference call. This may result in the utilization of one or a number of available bridges. If more than one bridge server 101 is available, the system 10 of the present invention determines, as will be explained later, which of the available bridge servers will be selected to service the conference call. If no bridge servers 101 are available, the on-demand conference caller is informed of the status and requested to call later.

It is to be expressly understood that the various subsystems and hardware components of system 10 of the present invention are well known and conventionally available.

Figure 2:
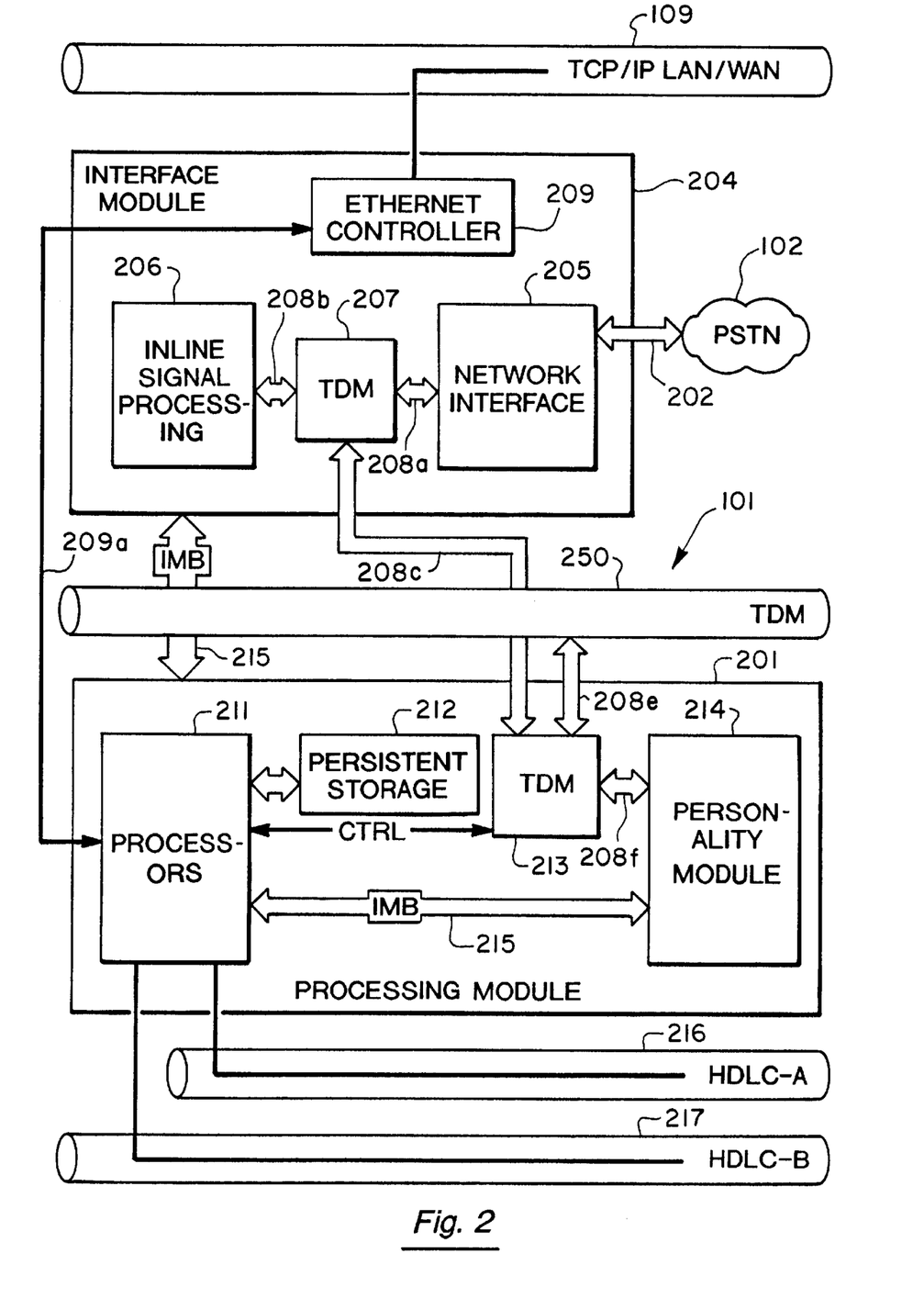
FIG. 2 is a bridge server hardware block diagram.

3. Bridge Server 101—One possible hardware embodiment of a bridge server 101 is shown in FIG. 2. It is contemplated that other forms of bridge hardware could be utilized within the conferencing system and remain within the spirit and scope of this present invention.

A bridge server 101 is composed of one or more processing modules 201 capable of managing and manipulating the channels 202 which connect it to the PSTN 102 via an interface module 204. The interface module 204 is composed of a network interface 205 interconnected to inline signal processing resources 206 through a time division multiplex (TDM) switching matrix 207. The inline signal processing 206 can be used to process (e.g., formatting and protocol changes) the data stream 208*b* before presenting it to the processing module 201 over bus 208*c,* or prior to sending it back to the PSTN 102 over bus 208*a,* depending on whether the data stream is inbound or outbound. The data stream is delivered between the network interface 205 and the TDM 207 over link 208*a,* between TDM 207 and inline signal processor 206 over link 208*b,* between TDM 207 and the processing module 201 over link 208*c.* Additionally, the interface module 204 provides an ethernet controller 209 in order to control the bridge server 101 from across the TCP/IP LAN/WAN 109. The controller 209 is connected over bus 209*a* to the processors 211.

The TDM channel 250 is a backplane connection to other interface modules 204 and communicates with TDM 213 over bus 208*e.*

The processing module 201 is composed of processors 211 that comprise a microprocessor complex which manages and controls the interactions of the data streams within the system. The processors 211 have access to a block of persistent storage 212, which can be used to store state information and other data necessary for the specific application—i.e., existing on-demand conference calls. The processors 211 control the flow of the telephony data stream (generally referred to as 208) through the use of a collocated TDM 213. The personality module 214 is composed of a set of digital signal processing (DSP) resources which manipulate the incoming data streams 208 to provide such functionality as conferencing, DTMF detection, voice prompting, etc. The processors 211 manage the devices in the processing module 201 and interface module 204 through an inter-module bus (IMB) 215. A localized control path is provided for host module to host module communication via an HDLC-A bus 216. Since interoperability between host modules is key to the bridge server operation, a secondary control path is provided through a backup HDLC-B bus 217.

The design of the hardware configuration for a conferencing bridge server 101 is conventional. Other hardware embodiments other than that shown in FIG. 2 could be utilized under the teachings of the present invention.

Figure 3:
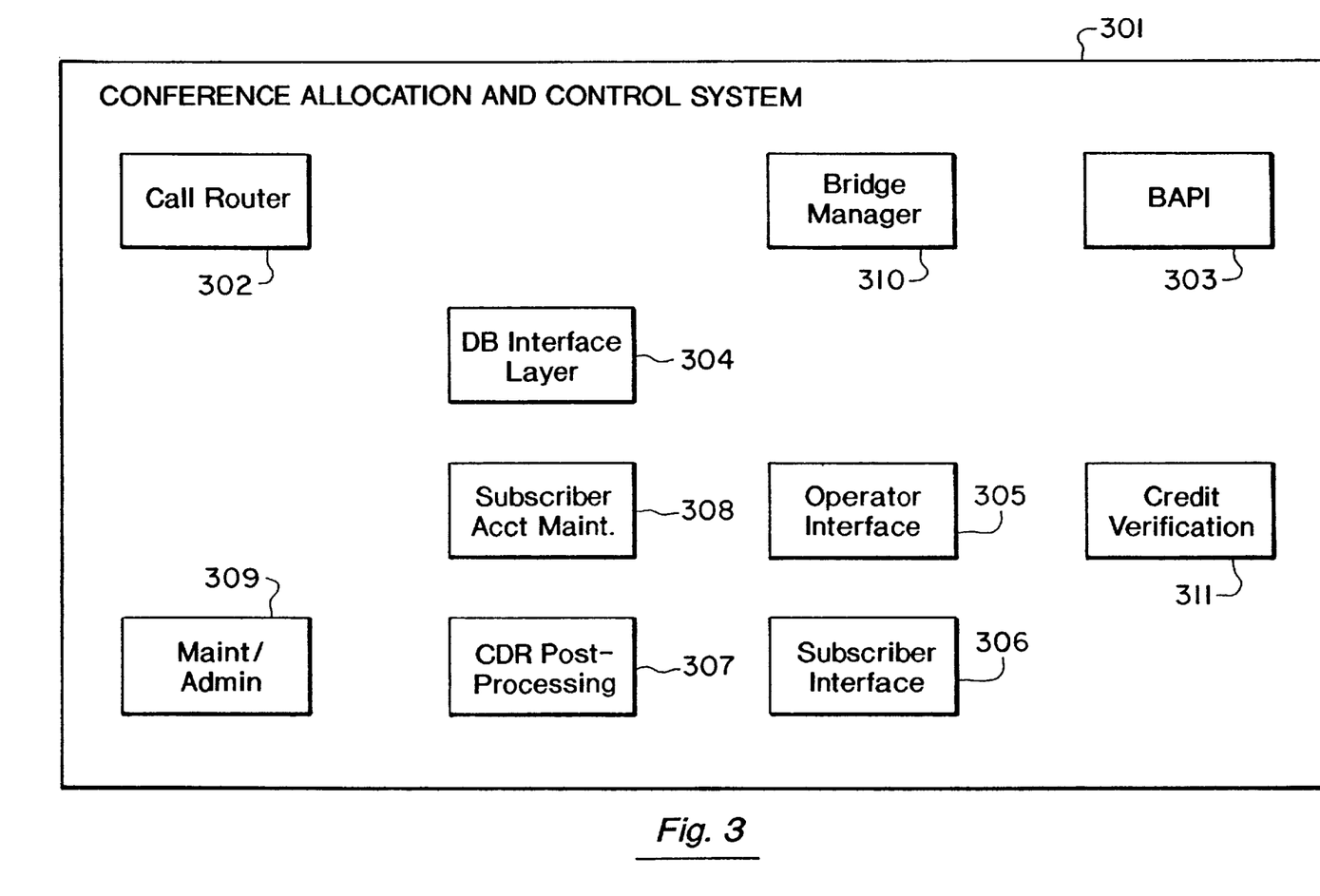
FIG. 3 is a software architecture diagram of the Conference Allocation and Control System (CACS)

4. CACS Software—The CACS software 301 shown in FIG. 3 is a collection of software processing modules and interfaces that run on a workstation or other processing platform 103.

The Call Router module 302 handles SCP pair 105 communication, bridge resource allocation, and maintains a mapping of the dialed number to bridge translation number for conferences in progress. It also maintains a local cache of subscriber access numbers and their associated conference size. This cached information allows the router to meet SS7 106 query response time requirements without depending on the access time of the subscriber database 104.

The Bridge Application Program Interface (BAPI) module 303 handles all communication between the various CACS processes and the bridge servers 101 in the system 10.

The Database Interface Layer module 304 makes all subscriber database 104 queries and routes data to other processes that request it. This process provides a level of shielding between the subscriber database 104 and the various other processes that utilize the data.

The Operator Interface module 305 is the application program interface to the operator/maintenance stations 107, and handles operator request queue management, registration for operator-monitored bridge events, and operator updates to the subscriber database 104.

The Subscriber Interface module 306 is an application programs interface to the conference control features available to the subscriber.

The CDR post-processing module 307 is a process that performs billing and rating functions by processing information from the Call Detail Record (CDR) and may be resident on the CACS workstation 103 or on a separate processing platform (not shown).

The Subscriber Account Maintenance module 308 conveys subscriber account data back and forth between the Operator Interface 305 and the Database Interface Layer 304 whenever this data is viewed or changed by an operator.

The Maintenance/Administration module 309 handles the interface with system-wide maintenance processes and generates appropriate commands and communications as necessary to accomplish a variety of CACS and bridge maintenance functions.

The Bridge Manager module 310 is a coordinated access point for all bridge status and control messages within the CACS 103. It maintains a mapping of subscriber ID to access number to bridge translation numbers for active conferences that enables queries of the subscriber database 104, which is keyed on subscriber ID. It also maintains mappings of bridge channel handles to CACS channel ID's and bridge conference handles to CACS conference ID's. It maintains a list of all available bridges, a list of active conferences (with subscriber information), and participant lists for active conferences. The state of operational bridges is stored in a bridge status table, which contains at least the following information:

BRIDGE ID (Field): NUMBER OF AVAILABLE PORTS (Field)

The CACS 103 maintains this table of all bridge servers 101a–101n. This table provides scalability since it is easy to add more ports to a single bridge server or to add an entire new bridge server simply by adding more entries in the table. This can be done, for example, upon system startup so that the CACS 103 always knows the current status of all bridge servers 101a–101n. It could also be determined on a periodic polling basis to continually update this information in the bridge status table, above. It can also be accomplished whenever changes or modifications to a bridge server 101a–101n are made. This can be on an interrupt basis or on an install or maintenance basis. With respect to maintenance, should any bridge in its entirety or any portion of a bridge server 101 fail, then the bridge status table can be easily modified to delete references to those ports or those bridge servers that have failed. In addition, the bridge status table also enables dynamic allocation of available ports, which are identified in each bridge server.

The Credit Verification module 311 is either an internal process that queries the subscriber database 104 to verify credit for the subscriber's account, or an application program interface to an external credit verification device that makes an external query.

Many of the functions of the software modules in FIG. 3 are conventional. Those functions that are unique under the teachings of the present invention are discussed later.

5. Call Signaling and Conference Setup—The creation, processing, and termination of an on-demand conference are described with reference to FIG. 4. A subscriber for the on-demand conferencing service of the present invention is assigned a number and is provided an initial passcode by the system. The subscriber chooses a maximum conference size from several options such as 10, 15, or 20 and provides other information such as, but not limited to, billing address, credit card number, e-mail address, etc. This information is stored in the subscriber database 104. The number assigned is a unique number identifiable by the PSTN 102 as requiring handling by the SS7 106. This subscriber information can be implemented in several ways. An operator takes subscriber information over the phone, sets up an account, and initiates service. This subscriber information may also be E-mailed or the subscriber can fill out an Internet form. The system processes the Internet form and returns a document to the subscriber on the Internet, in real time, including the subscriber's unique on-demand conference phone number and initial passcode. All of the subscriber information is loaded into the subscriber database 104.

In the preferred embodiment, the database 104 has fields for account entry date, subscriber ID, account ID, home, address, phone and fax numbers, E-mail address, on-demand phone number, passcode and account status (active or inactive) as well as other conventional subscriber account management and information fields.

Figure 4:
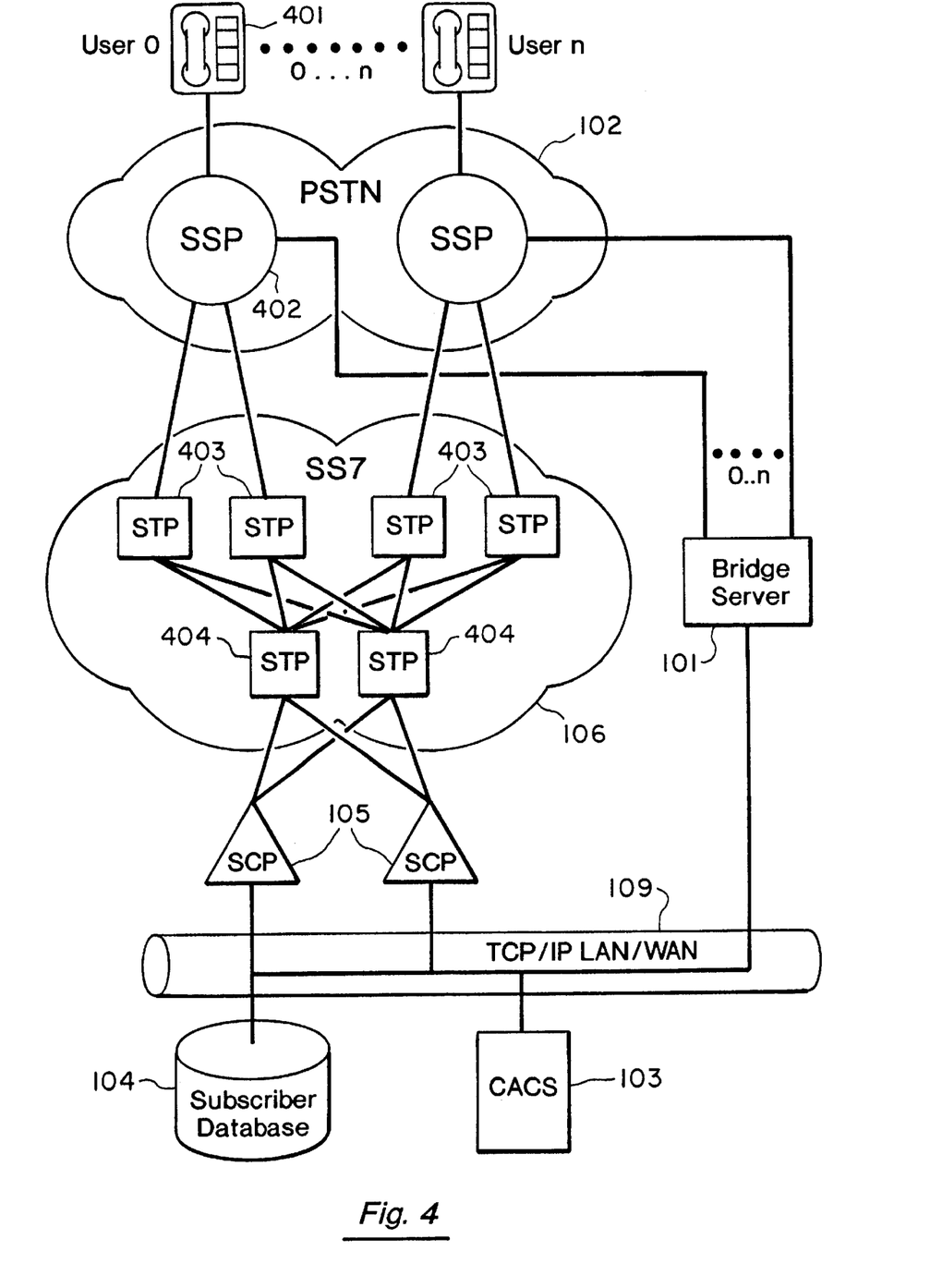
FIG. 4 details the process involved in establishing a voice connection between conferees via a bridge server.

The sequence begins when the telephone user (User 0) 401 dials the unique number such as an N00 (800/888) number with the subscriber who is sponsoring the conference. User 401 need not, but may be, the subscriber of the conferencing service. The call is connected to User 0's PSTN Service Switching Point (SSP) 402, which identifies the called number as requiring handling by the SS7 network 106 and makes an SS7 TCAP routing request query of that SS7 network's Signal Transfer Point (STP) pair 403a. The TCAP query requests routing instructions. The SS7 routing request is linked to the STP pair 404 that is linked to the On-Demand SCP pair 105. The SCP pair 105 has a unique point code (address) associated with it to facilitate routing. The CACS call router module 302 receives a routing request from over network 109 from the SCP pair 105. The CACS 103 selects a bridge server 101 with enough available capacity to handle the maximum number of conference participants allowed by the service (e.g., 20), allocates the capacity, and returns routing instructions in terms of a POTS or ONNET translation number through the SCP pair 105. Each bridge server 101 would have a unique POTS or ONNET translation number for every simultaneous conference allowed on the bridge. For example, if the on-demand service had a maximum participant capacity of 20, each bridge server would need at least 12 (240 ports/20 participants per conference) unique POTS or ONNET translation numbers. The translation numbers between bridge servers 101 would be unique because the translation numbers are used by the long distance carrier to control N00 routing within their network. The CACS 103 also notes that any other routing requests for the same N00 number will receive the same routing instructions until the on-demand conference is de-allocated. Finally, the CACS 103 would note which translation number is currently "assigned" to which N00 number so that a translation number can be tied to the dialed N00 number which can be tied to a participant which can be tied to the currently authorized participant/subscriber passcode. The SCP pair 105 encapsulates the routing instructions with an SS7 TCAP message and returns appropriate routing instructions via the SS7 network 106 to the originating service point 402. The on-demand call is routed via the PSTN 102 to the selected bridge server 101.

The dialing of the unique number into the PSTN, the routing of the number to SS7 106 and the identification of the number as requiring special handling by the SS7 106 are conventional. The assigning of such a number for on-demand conferencing is unique to the present invention.

a. Selection of Bridge

Figure 5:
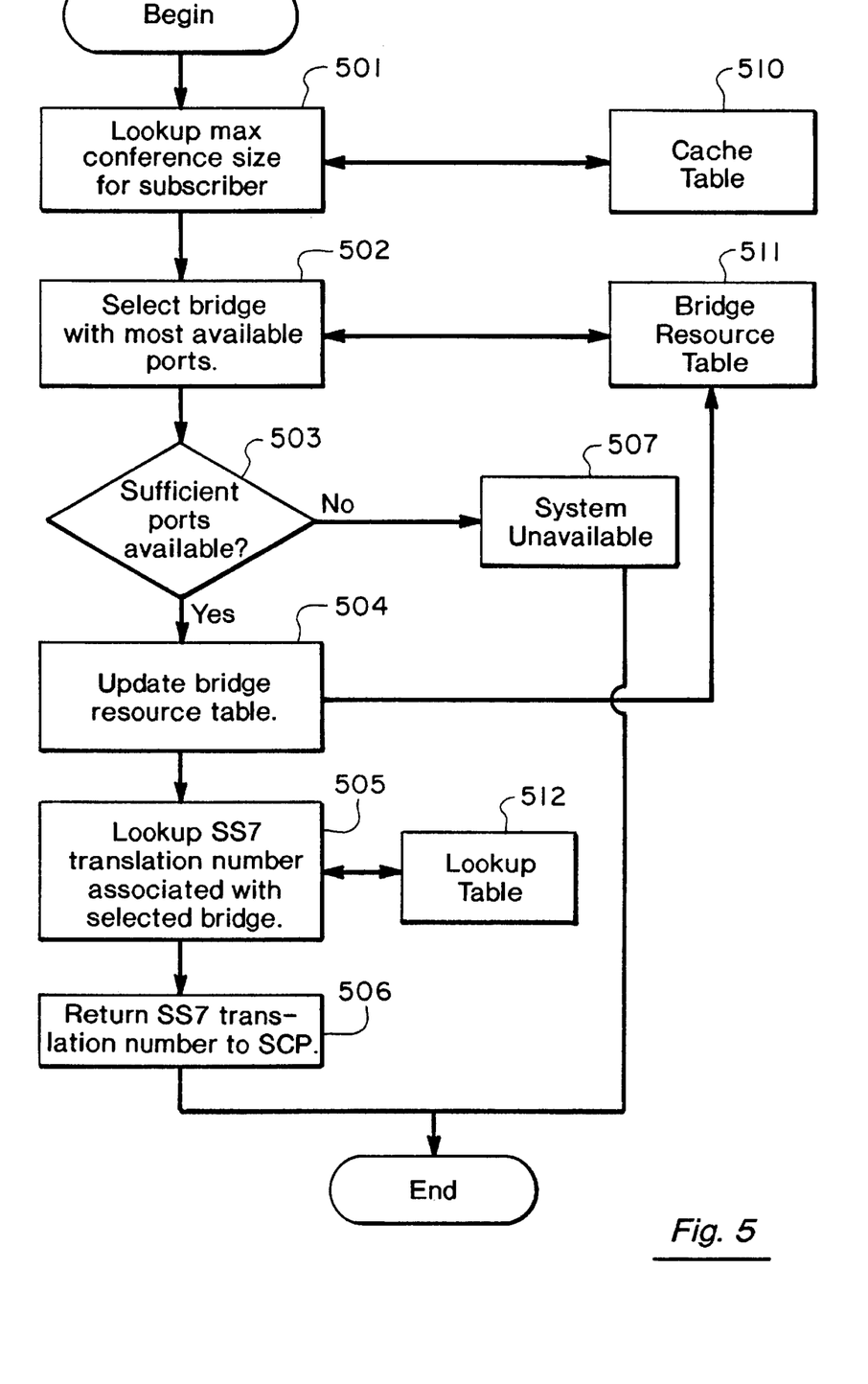
FIG. 5 is a flow chart describing the process by which the call router within the CACS selects a bridge server to host a new conference.

The decision of which bridge 101 in FIG. 1 should receive the call can be based on selection criteria that consider availability, load control, least-cost routing and component failure. One embodiment of this decision-making logic is illustrated in FIG. 5. Upon receipt of the routing request from the SCP pair 105, the call router module 302 looks up 501 the maximum permissible conference size associated with the subscriber (who is identified by the called number) in a cached mapping table 510 which is memory available to the Call Router module 302. The Call Router module 302 then selects 502, from its bridge resource table 511, the bridge 101 with the most available conferencing ports. If this bridge has enough available ports to support this new conference 503, then the Call Router module 302 allocates the required number of ports to this conference by updating 504 the bridge resource table which is memory available to the Call Router and Bridge Manager modules.

Finally, the Call Router module 302 obtains 505 a translation number in a lookup table 512 for the selected bridge and returns 506 this number to the SS7 network 106 via the SCP pair 105. If there are not enough conferencing resources available on the selected bridge, then a "system unavailable" message is returned 507 to the SS7 network 106.

The processing stage 503 in the preferred embodiment also includes a step of load management. A number of conventional approaches are available to manage bridge server resources when peak demands are made.

The system 10, after determining which bridge servers have ports available then determines of those which bridge servers are best from a load management determination. A determination is also made in the preferred embodiment as to which bridge server will be least costly to route the call. Again, conventional methods are available for this. And, a determination is also made as to which bridge servers are not in operation or which ports of particular bridge servers have failed hardware resources. Any one or all of these determinations (i.e., load management, least cost routing, and failed hardware resources) could be implemented under the teachings of the present invention.

The Call Router module 302 always contains the available capacity in the bridge status table so that for the next on-demand conferencing request the table will be fully updated with respect to the availability of ports on each bridge server. This feature is an important part of the dynamic allocation of the present invention.

The Call Router module 302 then sends a packet to the bridge manager 310 that maps the dialed number to the translation number that was provided to the SS7 network 106. The bridge manager 310 will later use this mapping to identify the subscriber that is associated with that particular translation number for use in subscriber database 104 queries. Once the call reaches a bridge server 101, the bridge sends a packet via BAPI 303 and the Bridge Manager module 310 to the Database Interface Layer 304 requesting subscriber information from the database 104, which is returned via the Bridge Manager module 310 and BAPI 303 to the bridge server 101. To accomplish this, the bridge manager 310 must relate the translation number that was supplied by the bridge server 101 to the original dialed number, which is used to identify the subscriber in the database 104. At this point, the bridge server places the call into a call-flow script, one possible embodiment of which is illustrated in FIG. 6.

b. Call Flow

Prior to a conference, the subscriber must choose a PIN for the conference and distribute the PIN and the unique on-demand access number to the participants.

Figure 6:
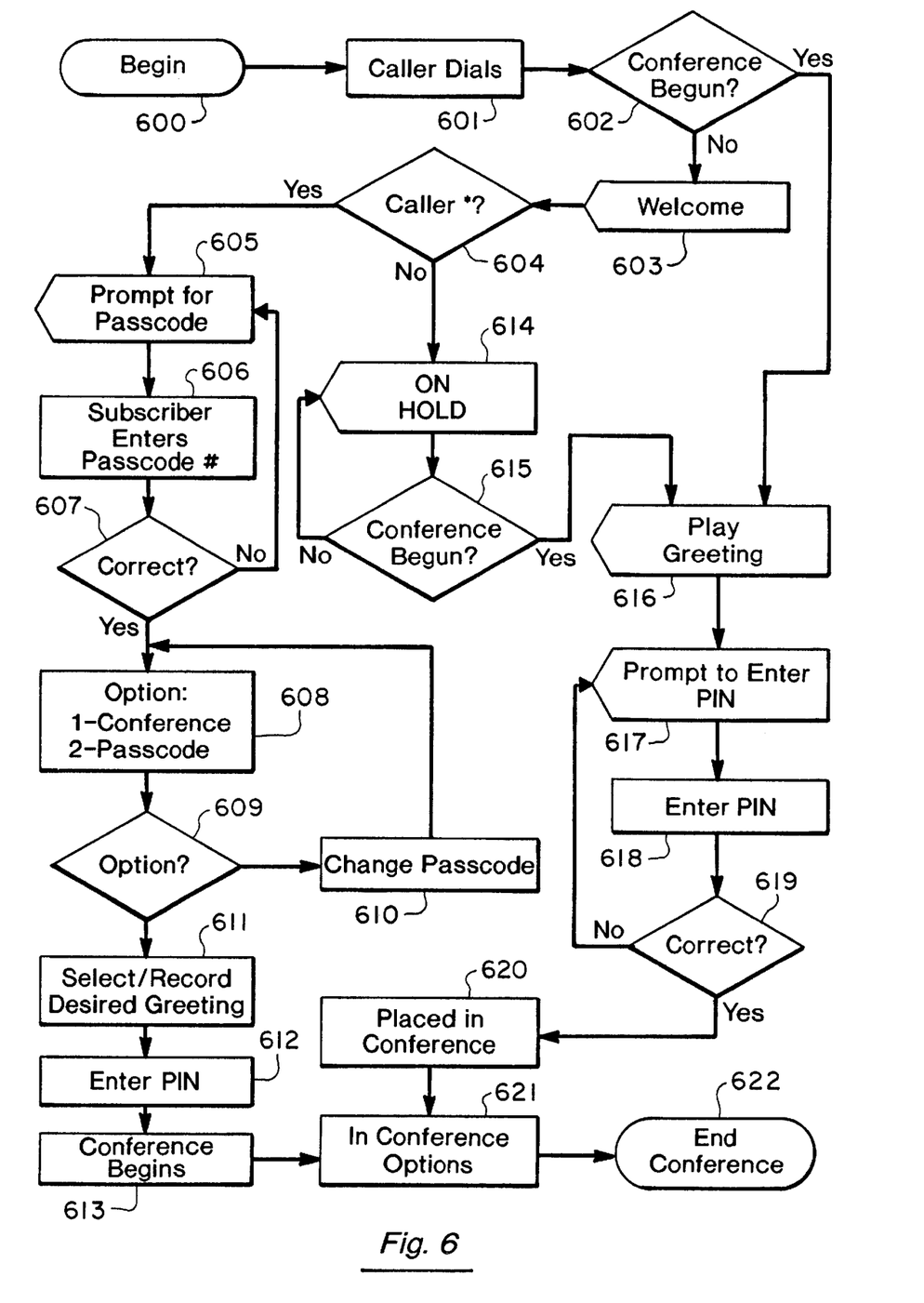
FIG. 6 is a call flow diagram for one embodiment of the conferencing system; and, FIG. 7 details the interfaces available to system users.

In FIG. 6, the on-demand conference begins 600 when the caller dials in the unique on-demand number 601. The steps take place as described above to select the bridge server 101 having enough ports available for the subscriber's maximum call. A decision is made as to whether the conference has begun 602. If not, the system of the present invention plays an initial welcome 603 such as:

"Welcome to on-demand conferencing. Your conference has not yet begun. If you are the subscriber, press the '*' button. If you are a participant, please hold."

When the call flow script detects that the person calling is the subscriber by sensing 604 the pressing of the "*" key, it sends a credit verification request to the credit verification module 311 via BAPI module 303. After some time, the credit verification information is returned to the bridge server 101 via BAPI module 303. During this delay, the call flow script prompts the subscriber to enter his or her subscriber passcode 605.

For example, the passcode entered 606 could be:

79165

Any suitable number of characters could be used under the teachings of the present invention, although the preferred embodiment uses 4 to 10 digits. A decision is made as to whether the passcode is correct 607. If not, then stage 605 is re-entered. If correct, stage 608 is entered. After three incorrect attempts to enter the passcode, the caller is routed (not shown in FIG. 6) to an operator station 107, a wrong passcode recording is played and/or the caller is disconnected.

Upon entry of a valid passcode, the subscriber is given the option 608 to change its passcode or to start a conference. A decision as to which option occurs is made in stage 609. If the passcode is to be changed stage 610 is entered. If the conference option is selected, the subscriber is given the option 611 of recording a custom greeting or using a system default greeting for the conference. The system then prompts the subscriber to enter a conference PIN code, which can be of variable length (including no PIN) 612. For example, the PIN could be:

121

This is when the system of the present invention learns the PIN for the conference.

Once credit has been verified and the conference PIN has been entered, the conference is started 613 on the selected bridge server 101. When this occurs, the selected bridge server 101 sends a conference start packet via BAPI module 303 and the Bridge Manager module 310 to the Operator Interface module 305, which supplies a conference list change message to the operator stations 107 that are registered to monitor changes on this particular bridge 101. After the conference begins 613, stage 621 is entered to monitor for and to provide in conference options discussed later. The system of the present invention has fully set the on-demand conference call up without subscriber reservation or operator control. Even with an operator station 107 assigned, the conference call will be completed without operator intervention provided the subscriber or any participant does not contact the operator.

When an incoming caller to the bridge server 101 is not identified 604 as the subscriber, then they are a participant and are placed on hold 614 until the subscriber has completed recording the greeting 611 and the subscriber has entered the conference PIN 612. Once the conference has started as determined in stage 615, participants are played the subscriber's chosen greeting 616 and prompted to enter the conference PIN 617. The participant then enters the PIN (which in the example above is "121") in stage 618. Upon correct entry 619 of the conference PIN, the caller is added 620 to the conference and enters stage 621. A participant has three tries to enter the PIN successfully and then is disconnected or connected to an operator station (not shown in FIG. 6). As each participant joins the conference, a participant join message is sent via BAPI module 303 and the bridge manager 310 to the operator stations 107 that are monitoring changes on this bridge 101. The join message informs the Bridge Manager module which participant has joined the conference call. The bridge server 101 sends a similar message when participants disconnect or are dropped.

After the subscriber has entered stage 613, any new participants will be immediately directed from stage 602 to stage 616.

The conference ends 622 only when the subscriber disconnects. Participants can disconnect during the conference without terminating the conference (not shown in FIG. 6). At this time, any remaining participants are played a short message and disconnected by the bridge 101, which then sends a conference end message to the Bridge Manager 310 via BAPI 303, which sends the conference end message to the call router module 302 so that bridge resources can be de-allocated. The bridge manager 310 also sends a message to the operator interface 305, which posts the conference list change to the operator stations 107 that are registered to receive changes on this bridge 101. The operator stations 107 then deletes the participant list associated with the just-ended conference.

While a preferred method for call flow has been described, it is to be understood that variations on the above could occur and still be within the teachings of the present invention. For example, other services could be added. In stage 608, the subscriber may select other options such as record the conference, roll call, etc. Also, the order of the flow in FIG. 6 can vary. For example, stages 617, 618, and 619 can occur before stage 616.

c. Subscriber and Participant Control

Figure 7:
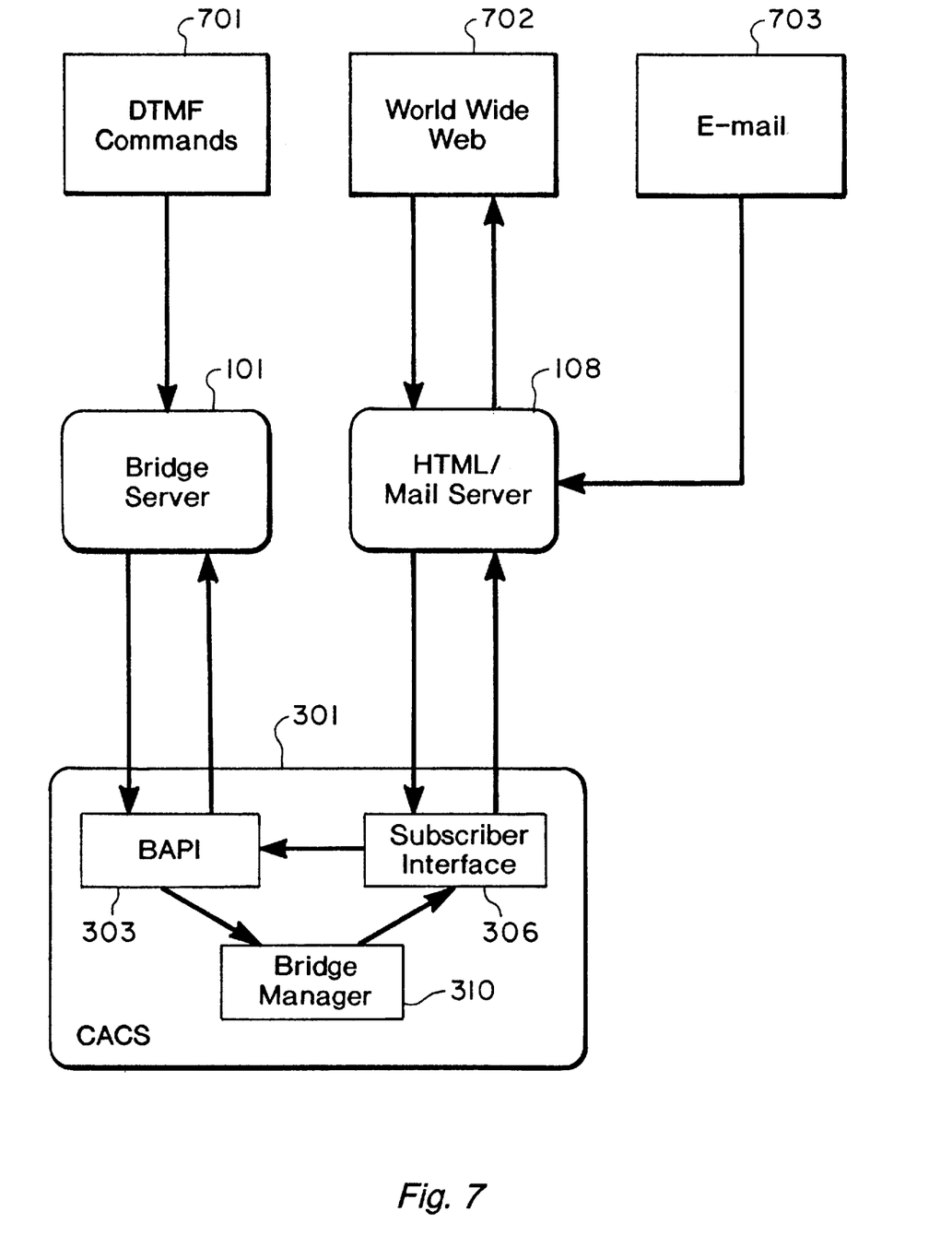

FIG. 7 illustrates the variety of conference control interfaces that are provided to the subscriber and to the conference participants in Stage 621 of FIG. 6. Conferees may enter DTMF commands 701 via their telephone keypad, which are conveyed within the audio channel to the bridge server 101 that is servicing the conference. These commands provide control over several in-conference options, many of which are supported by prior art conferencing systems. In the preferred embodiment, these commands include operator recall, participant count, conference lock/unlock, access to an outside line, and disconnect addressed lines. When a command by a subscriber or participant is entered, the bridge server 101 conveys a conference status change message to the CACS Bridge Manager module 310 via BAPI 303. This status change is passed along to the subscriber interface 306 and then to the HTML/mail server 108, which provides the status change information to any World Wide Web (WWW) 702 users whose browsers may be registered for this information. Subscribers can issue similar commands via the WWW interface 702, which commands are passed to the bridge 101 via the HTML/mail server 108, the subscriber interface 306, and BAPI 303. Non-subscriber participants can view conference status information on a similar WWW 702 interface on which command features (which are restricted to the subscriber) are disabled.

Additionally, the system supports electronic mail 703 conference initiation, whereby a specially formatted text message is parsed within the HTML/mail server 108 to extract a conferee list. When this information is received, the subscriber interface 306 instructs the call router 302 to connect the conferees together with the subscriber by initiating the appropriate SS7 routing messages.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

We claim:

1. A conferencing method for setting up an on-demand conference call for a subscriber in a telecommunication system, said on-demand conference call having a conference size for a plurality of users, the method comprising the steps of:

assigning a unique number for the on-demand conference call;

delivering the assigned number to the plurality of users, receiving a request based on the assigned number and the conference size from the telecommunication system in a conference allocation and control system (CACS) connected to a plurality of bridge servers, the CACS located externally to the telecommunication system, each of said plurality of bridge servers having a plurality of ports, each of said plurality of bridge servers having sufficient ports to support a plurality of on demand conference calls;

selecting in the CACS available ports for the conference size on one of said plurality of said bridge servers so as to dynamically allocate the selected ports to the on-demand conference call;

setting up the on-demand conference call in the telecommunications system on said selected ports on the one selected bridge server under control of the CACS;

connecting the plurality of users to the set-up on-demand conference call when each of the plurality of users dials the assigned number into the telecommunication system;

informing the subscriber over the telecommunication system when ports are not available for the on-demand conference call.

2. The method of claim 1 wherein the step of selecting further comprises the step of selecting the bridge servers based on load control criteria.

3. The method of claim 1 wherein the step of selecting further comprises the step of selecting the bridge servers based on routing cost criteria.

4. The method of claim 1 wherein the step of selecting further comprises the step of selecting bridge servers based on failed hardware resource criteria.

5. The method of claim 1 further comprising the step of changing the status of the on-demand conference call when any of the plurality of users inputs a status change using Dual-Tone Multifrequency commands to the CACS.

6. The method of claim 1 further comprising the step of changing the status of the on-demand conference call when any of the plurality of users inputs a status change over a World Wide Web interface to the CACS.

7. The method of claim 1 further comprising the step of changing the status of the on-demand conference call when any of the plurality of users inputs a status change over an email interface to the CACS.

8. The method of claim 1 further comprising the step of ending the on-demand conference call only when the subscriber disconnects from the telecommunication system.

9. The method of claim 8 further comprising the step of playing a message to the remaining users that the conference call has terminated prior to the step of ending.

10. The method of claim 1 further comprising the steps of:

adding at least one bridge server having a number of ports to the CACS, updating a bridge status memory in the CACS to identify the added bridge server and the number of ports.

11. A conferencing method for setting up an on-demand conference call for a subscriber in a telecommunication system, said on-demand conference call having a conference size for a plurality of users, the method comprising the steps of:

receiving a request based on the conference size from the telecommunication system in a conference allocation and control system (CACS) connected to a plurality of bridge servers the CACS located externally to the telecommunication system, each of said plurality of bridge servers having a plurality of ports, each of said plurality of bridge servers having sufficient ports to support the conference size;

selecting in the CACS available ports for the conference size on one of said plurality of said bridge servers;

setting up the on-demand conference call in the telecommunications system on said selected ports on the one selected bridge server under control of the CACS;

updating a bridge status memory file in the CACS that the one said bridge server and the available ports are selected for the on-demand conference call so as to make the selected ports unavailable;

connecting the plurality of users to the set-up on-demand conference call.

12. The method of claim 11 further comprising the steps of:

adding at least one bridge server having a number of ports to the CACS, updating the bridge status memory in the CACS to identify the added bridge server and the number of ports.

13. The method of claim 11 further comprising the steps of:

adding ports to one of the plurality of bridge servers in the CACS;

updating the bridge status memory in the CACS to identify the added ports for the aforesaid one bridge server.

14. The method of claim 11 further comprising the steps of:

updating the bridge status memory when any ports in any of the plurality of bridge servers fail.

\* \* \* \* \*